Patented Oct. 24, 1922.

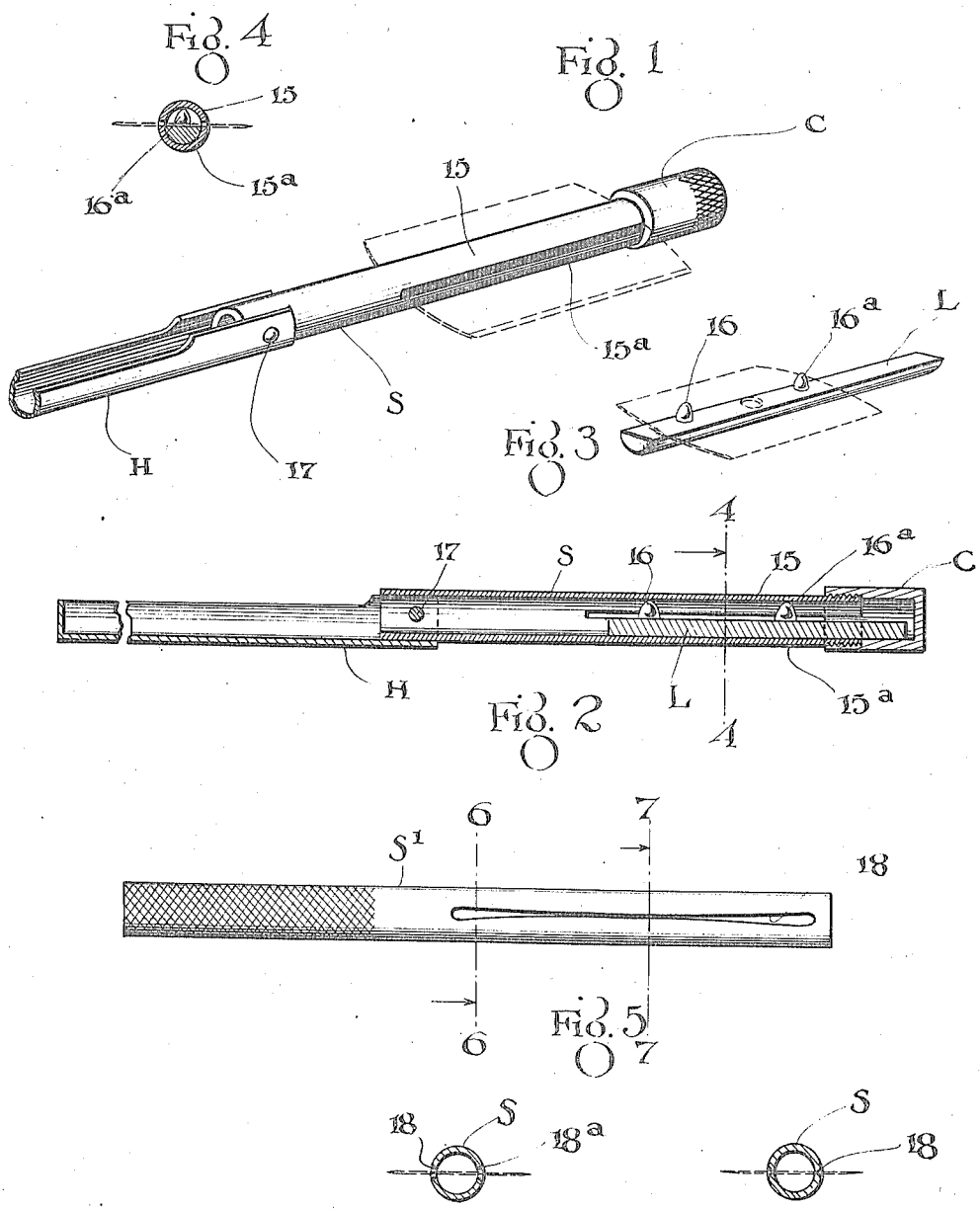

1,433,375

UNITED STATES PATENT OFFICE.

AUGUST FREDRICK ISCHINGER, OF PITTSBURGH, PENNSYLVANIA.

HOLDER FOR STROPPING SAFETY-RAZOR BLADES.

Application filed May 21, 1920. Serial No. 383,154.

*To all whom it may concern:*

Be it known that I, AUGUST FREDRICK ISCHINGER, a citizen of the United States, and a resident of Pittsburgh, in the county of Allegheny and State of Pennsylvania, have invented certain new and useful Improvements in Holders for Stropping Safety-Razor Blades, of which the following is a specification.

My invention relates to means for holding safety-razor blades while being stropped or honed, and a purpose of my invention is the provision of a simple, inexpensive and efficient holder so constructed that the safety-razor blade can be securely held within the holder during stropping or honing of the blade, and can be readily detached from the holder.

I will describe two forms of holders embodying my invention and will then point out the novel features thereof in claims.

In the accompanying drawings:

Figure 1 is a view showing in perspective one form of holder embodying my invention.

Figure 2 is a longitudinal sectional view of the holder shown in Figure 1.

Figure 3 is a detailed perspective view of the locking bar shown in Figure 2.

Figure 4 is a transverse sectional view taken on the line 4—4 of Figure 2.

Figure 5 is a view showing in side elevation another form of holder embodying my invention.

Figure 6 is a transverse sectional view taken on the line 6—6 of Figure 5.

Figure 7 is a view similar to Figure 6 taken on the line 7—7 of Figure 5.

Similar reference characters refer to similar parts in each of the several views.

Referring specifically to the drawings and particularly to Figures 1 and 2, S designates a tubular shank formed of resilient metal which is split at diametrically opposite points beginning at its outer end and extending inwardly for a major portion of its length to provide companion jaws 15 and 15ª which are preferably of semi-circular contour in cross section, as clearly shown in Figure 4. Adapted to be inserted into the shank S and within the jaws 15 and 15ª is a locking bar L which as shown in Figure 3 is preferably of semi-circular contour in cross section and is provided upon its flat side with a pair of spaced lugs 16 and 16ª that are adapted to project through the two end openings of a safety-razor blade of the Gillette type, as shown in phantom in Figure 3. The free ends of the jaws 15 and 15ª are screw threaded exteriorly to receive a locking cap designated at C and having its outer surface knurled to facilitate the screwing and unscrewing of the same. The opposite end of the tubular shank S carries a handle H adapted to be gripped in manipulating the holder when stropping or honing a blade. As shown in Figures 1 and 2, the handle H is pivotally connected at its forward end to the shank S by a pin 17, and the contour of the handle is such as to permit of the partial housing of the shank S when it is folded within the handle, as will be understood, thus providing a holder which can be folded compactly and easily carried.

In the applied position of the locking bar L within the jaws 15 and 15ª, the razor-blade is first placed upon the locking bar as shown in phantom in Figure 3. This step having been completed the locking bar with the razor blade in place, is now inserted within the shank and between the jaws in the manner shown in Figure 4. The locking bar having been pushed home so as to cause the inner end of the blade to abut the inner end of the slot of the shank, as shown in phantom in Figure 1, the jaws 15 and 15ª are now compressed, thus reducing their diameter to permit of the application of the locking cap C. The locking cap C having been applied it is screwed home so as to abut the outer end of the blade thereby maintaining the jaws in compressed position so as to firmly engage the locking bar L and to prevent longitudinal movement of the bar and blade within the shank so that the holder is now ready for use in the stropping or honing of the blade.

To remove the blade from the holder, it will be clear that upon removing the cap C, the jaws 15 and 15ª expand to their normal position thus allowing the ready removal of the locking bar L with the blade.

Referring now to Figures 5 and 6, I have here shown another form of razor blade holder embodying my invention which is particularly designed for the holding of blades having a single cutting edge and a reinforced opposite edge such as the Ever-Ready blade. This holder comprises a shank S′ which is also formed of metal and which is slotted longitudinally for a portion of its length as indicated at 18 and 18ª. As shown in Figure 6, the slots 18 and 18ª are disposed at diametrically opposite points, and each slot is tapered from its opposite ends toward the center thereof so that the walls of the intermediate portion are spaced apart a distance less than the walls of the end portions of the slot, as shown in Figure 5. The purpose of this particular arrangement is to effect the gripping of a razor blade at a point intermediate its ends and to thus prevent the accidental displacement of the blade from the holder. As shown in Figure 7, the walls of the slot are rounded so as to facilitate the introduction of the blade into the slots. In the applied position of the blade within the holder, the walls of the intermediate portion of the slots serve to effectively grip the sides of the blade between its ends to retain the blade within the holder and to permit the ready removal thereof by gripping one end of the blade.

Although I have herein shown and described only two forms of razor blade holders embodying my invention it is to be understood that various changes and modifications may be made herein without departing from the spirit of the invention and the spirit and scope of the appended claims.

What I claim is:

1. A razor blade holder comprising, a tubular shank formed of resilient metal split from one end and longitudinally for a portion of its length to provide opposing companion jaws, a locking bar insertable from said end between the jaws, lugs formed on the locking bar and adapted to project through the openings of a razor blade, a screw threaded cap engaging the outer ends of said jaws for compressing the same to engage said locking bar and abut the outer end of the blade, and a handle pivotally supported on said shank.

2. A razor blade holder comprising, a shank, a pair of resilient jaws formed on the shank, a locking bar arranged between the jaws, lugs formed on the locking bar for engagement with the openings of a safety-razor blade, and means for compressing the jaws to clampingly engage the locking bar, and abut the outer end of the blade to prevent longitudinal movement thereof.

3. A razor blade holding device comprising a tubular shank split longitudinally to define a pair of semitubular resilient jaws including a considerable portion of its length said jaws adapted to clampingly hold a blade-locking and carrying bar within them, and a hollow handle pivotally connected adjacent one end to the shank and of a contour to partially house the shank when the shank and handle are folded together on their pivot.

AUGUST FREDRICK ISCHINGER.